United States Patent
Heesch (10) Patent No.: US 6,609,671 B2
(45) Date of Patent: Aug. 26, 2003

(54) FISHING REEL SPOOL

(76) Inventor: Christian M. Heesch, 2700 Ambassador Caffery Pkwy., Apt. 2, Lafayette, LA (US) 70506

(*) Notice: Subject to any disclaimer, the term of this patent is extended or adjusted under 35 U.S.C. 154(b) by 0 days.

(21) Appl. No.: 09/867,185

(22) Filed: May 29, 2001

(65) Prior Publication Data

US 2002/0195511 A1 Dec. 26, 2002

Related U.S. Application Data (60) Provisional application No. 60/217,890, filed on Jul. 12, 2000.

(51) Int. Cl.[7] .................. A01K 89/00; A01K 89/01; A01K 89/015
(52) U.S. Cl. ................ 242/322; 242/586; 242/587.2; 242/609.3; 242/613
(58) Field of Search ................. 242/322, 579, 242/586, 587, 587.2, 587.3, 609.2, 609.3, 613

(56) References Cited

U.S. PATENT DOCUMENTS

| | | | | |
|---|---|---|---|---|
| 969,146 A | * | 8/1910 | Soule | 242/587 |
| 1,761,750 A | * | 6/1930 | Schafer | 242/322 |
| 1,855,738 A | * | 4/1932 | Case | 242/322 |
| 2,309,146 A | | 1/1943 | Whistler | 242/118 |
| 2,525,169 A | | 10/1950 | Dodge | 242/118 |
| 2,573,240 A | * | 10/1951 | Berlinger | 242/322 |
| 2,669,400 A | | 2/1954 | Wood | 242/125 |
| 2,696,951 A | | 12/1954 | Wood | 242/119 |
| 2,777,648 A | | 1/1957 | Wood | 242/119 |
| 3,201,059 A | * | 8/1965 | Winkel | 242/613 |
| 3,329,367 A | * | 7/1967 | Paradiso | 242/609.3 |
| 3,442,464 A | * | 5/1969 | Broos | 242/587.2 |
| 3,536,275 A | * | 10/1970 | Salomon | 242/609.2 |
| 3,743,208 A | * | 7/1973 | Schmitz | 242/609.2 |
| 3,905,561 A | * | 9/1975 | Kilch et al. | 242/579 |
| 3,940,085 A | * | 2/1976 | Campbell | 242/609.2 |
| 3,977,429 A | * | 8/1976 | Stevenson | 242/609.2 |
| 5,165,623 A | | 11/1992 | Smith | 242/322 |
| 5,195,699 A | * | 3/1993 | Stinnette | 242/322 |
| 5,381,981 A | * | 1/1995 | Nelson | 242/609.2 |
| 5,507,443 A | | 4/1996 | Miyazaki | 242/322 |
| 6,241,181 B1 | * | 6/2001 | Campbell | 242/609.3 |

FOREIGN PATENT DOCUMENTS

| | | | | |
|---|---|---|---|---|
| CA | 577885 | | 9/1959 | |
| GB | 000565901 | * | 12/1944 | 242/609.3 |

* cited by examiner

*Primary Examiner*—Emmanuel Marcelo
(74) *Attorney, Agent, or Firm*—Garvey, Smith, Nehrbass & Doody, L.L.C.; Charles C. Garvey, Jr.; Brett A. North (57) ABSTRACT

A new spool design for fishing reels is disclosed, allowing for the reversible separation of the spool into different parts for the easy removal of old fishing line and wherein a specially configured aperture is exposed upon separation of the spool parts, allowing for the introduction of one end of the line into the interior of the spool. The line can be attached to the inside of the spool, providing for a secure fastening of the line without exposure of the knot to the exterior of the spool.

26 Claims, 5 Drawing Sheets

FISHING REEL SPOOL

CROSS-REFERENCE TO RELATED APPLICATIONS

Priority of U.S. Provisional Patent Application Ser. No. 60/217,890, filed Jul. 12, 2000, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to fishing reels and spool constructions, more particularly to spinning reels and an improved configuration for a spinning reel spool.

2. General Background of the Invention

Spinning reels are currently the most popular reels used for sport fishing world-wide. While the basic design of these reels has seen some changes since their introduction in the early 1900's, two problems remain that are related to the design of the spools used in this type of fishing reel.

The first problem consists of the cumbersome process of removing old fishing line from the spool. Currently, the line has to be manually pulled off the spool, foot by foot, a time consuming and frustrating process that leaves a large heap of tangled line. Since many fishermen put off the time consuming and boring changing of line, many a "big one" gets away due to the braking of old, damaged line.

The second problem relates to the fastening of the fishing line to the spool. Modern spools are usually made of polished aluminum or smooth graphite materials. While use of these materials allows for long casts with a minimum of friction, fastening of the end of the line to the spool becomes a weak point. Hard fishing lines, especially modern braided lines, will at times not develop sufficient friction between the innermost layer of the line and the spool. This problem increases at lower temperatures. In these situations, cranking the handle of the reel will not lead to the taking up of line, but rather to the rotation of the entire coil of line around the spool.

Many fishermen try to avoid this problem by attempting to securely tighten the line around the spool using elaborate knots. This, however, does not reliably eliminate the problem. Moreover, the bulky knots used for tightening may interfere with the smooth release of line during the casting process, especially with modern, elongated spools designed for long-distance casting. Previous designs, offering the attachment of line by way of through holes or slots in the spool, or by way of external notches in the spool, fail to solve this problem satisfactorily, as outlined below.

DESCRIPTION OF THE PRIOR ART

U.S. Pat. No. 6,015,111 to Berke describes a spool having a detachable flange for removing damaged line. The Berke patent does not relate to a fishing reel spool construction but rather to a separate line winding tool.

U.S. Pat. No. 5,507,443 to Miyazaki discloses a notch in the barrel of a spool, for securing line.

U.S. Pat. No. 5,165,623 to Smith describes a fishing reel spool containing an elongated opening, generally parallel to the spool axis, with multiple smaller orthogonal side openings. Securement of line to the spool occurs through wedging of a preformed knot at the end of the line into smaller orthogonal portions of the longitudinal slot. Separation of the line from the spool is possible through retrograde movements of the line and detachment of the preformed knot from its wedged position.

U.S. Pat. No. 5,120,003 to Sacconi discloses a fishing reel spool which can be threadably separated, and a cartridge spool which contains line and which fits over a first spool axle, both spools being reversibly locked together by a locking detent. The fishing reel spool is not designed to take up line directly without a cartridge spool.

U.S. Pat. No. 4,196,864 to Cole teaches a line winding tool including a take-up spool with removable flange for removing line from a conventional fishing reel spool.

U.S. Pat. No. 4,103,843 to Nothdurft teaches a fishing reel design which includes a spool and cover both having an aperture. The fishing line is passed through both apertures and then knotted at the outside of the cover of the spool.

U.S. Pat. Nos. 2,777,648; 2,696,951; and 2,669,400 to Wood describe an arbor, to be mounted on the shaft of a conventional fishing reel spool, containing apertures for attachment of fishing line.

U.S. Pat. No. 2,309,146 to Whistler teaches a spool with a transverse bore through a hub portion and a spindle for passing one end of a fishing line to be wound on said spool.

BRIEF SUMMARY OF THE INVENTION

The suggested new spool consists of two parts, an upper part, and a lower part, which can be assembled or taken apart using a simple mechanism of external and internal threads. Removal of old line now becomes very quick and hassle free: the two segments filled with line are simply taken apart, leaving immediately a neat coil of old line that can be discarded easily.

In addition, one of the two segments of the spool features a small opening at the site of attachment of the opposing segment. This opening is used to introduce the end of the line, which is then attached to a small wire loop on the inner surface of that same spool segment. This will lead to a secure connection of the line to the spool, eliminating possible gliding of the entire coil of line around the spool. The knot of the connection is hidden inside the spool, avoiding all interference of the knot with the smooth separation of line from the spool during the casting process. Since the knot is firmly attached to the interior of the spool, it cannot slip out of the opening.

By modifying the spool structure, the invention, iter alia, substantially shortens the process of line removal, provides for a secure connection of the line to the spool, and eliminates possible interference of the knot with the casting process.

A feature of the present invention is that the spool can be taken apart in a plurality of segments for easy line removal. The spool described uses a simple threading mechanism to join the two segments of the spool. An additional conventional locking mechanism could be used to prevent all accidental loosening of the connection, and/or any other conventional locking mechanism could be used instead of the threads to join the spool segments.

Another feature of the present invention is that the line is attached firmly to structural parts of the spool center, and not simply wound around the spool, thus preventing the slipping of the entire line coil. The invention described here uses a single opening and a wire loop connector at the inside of the spool for the fastening of the line. Multiple variations of this, using one or more openings, and/or various devices for the attachment of the line, could be used.

Yet another feature of the present invention is that the knot of the line connection is hidden inside the spool, thus avoiding possible interference with the casting process, yet being firmly connected to the spool, avoiding potential separation of the line end from the spool that may be caused by backward movements of the line.

BRIEF DESCRIPTION OF THE DRAWINGS

In most of the drawings, only the spool itself, and not the entire reel, is depicted. For better clarity, the illustrations do not feature any of the usual details at the upper and lower ends of the spool, nor its connection to the spool shaft or the drag system. These parts and details vary significantly between the many types and brands of spinning reels, yet they are of no particular importance to understand the this improved spool and reel design.

For a further understanding of the nature, objects, and advantages of the present invention, reference should be had to the following detailed description, read in conjunction with the following drawings, wherein like reference numerals denote like elements and wherein:

FIGS. 5A and 5B are vertical sectional and end views of a third embodiment of the apparatus of the present invention, and wherein FIG. 5B is a sectional view taken along lines 5B—5B of FIG. 5A.

DETAILED DESCRIPTION OF THE INVENTION

Referring now to FIGS. 1A, 2A–25 and 3 of the drawings, the preferred embodiment of the apparatus of the present invention is designated generally by the numeral 12. A conventional spool for a spinning reel SR and rod R combination is designated by the numeral 1 in FIG. 1.

Figure 1:
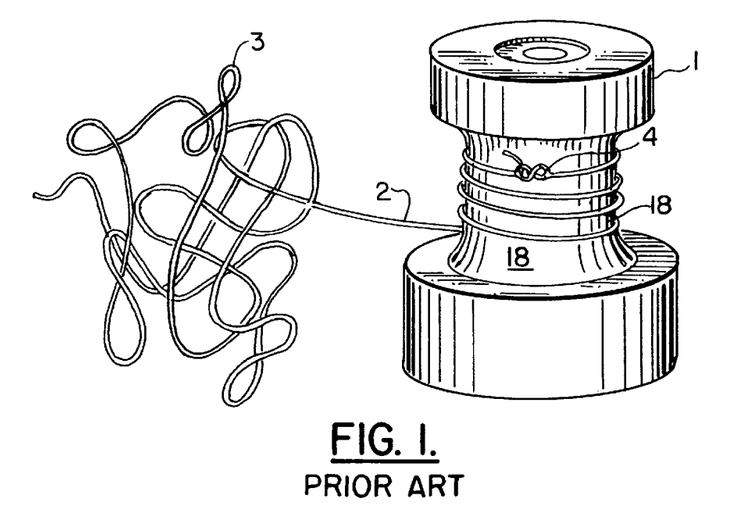
FIG. 1 is a perspective view of a standard spool for use with modern spinning reels.
Figure 1A:
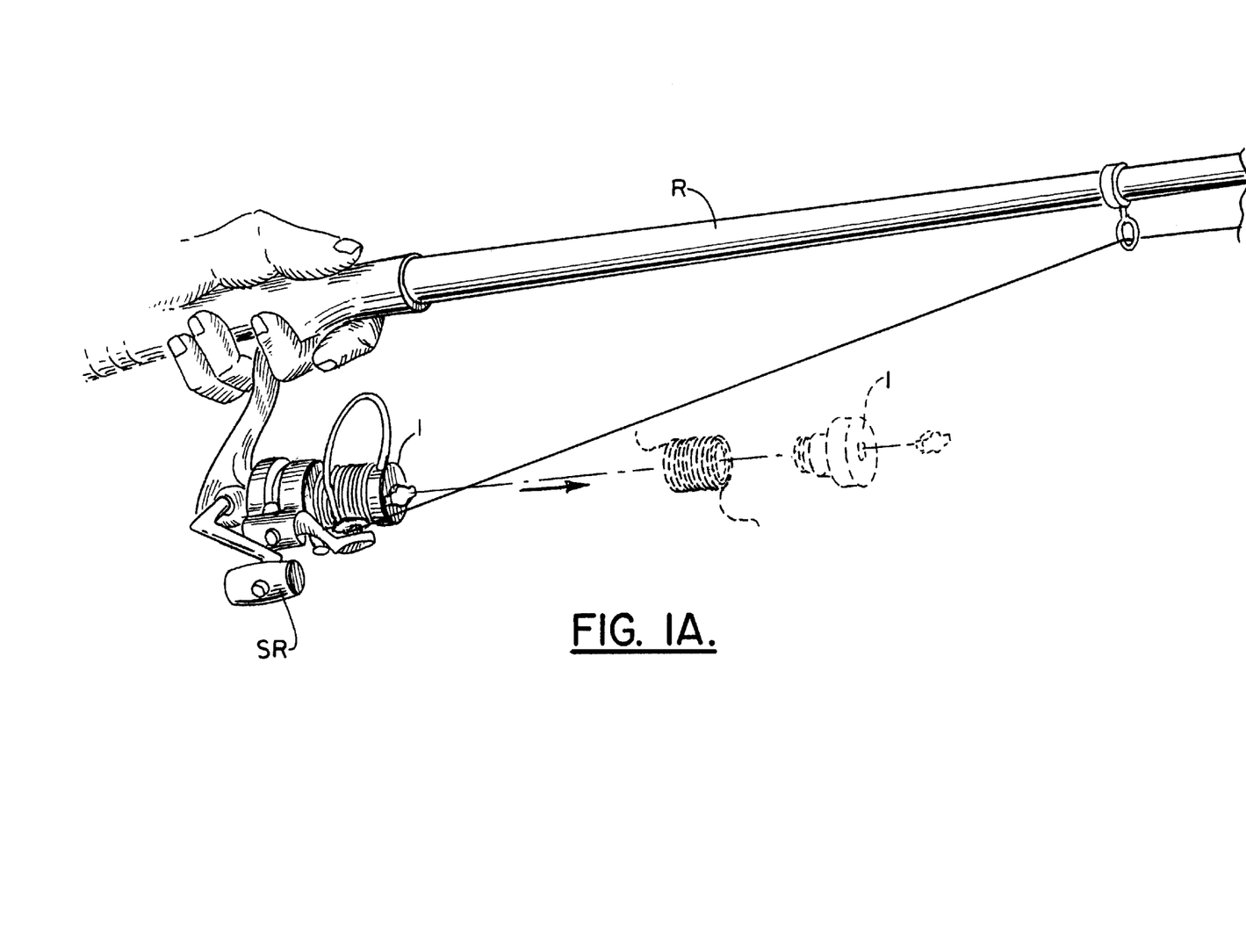
FIG. 1A is a perspective view of the preferred embodiment of the apparatus of the present invention, showing its attachment to a known spinning reel and rod assembly.

FIG. 1 depicts a conventional prior art spool 1 for a spinning reel. The line 2 has been removed from the spool 1 in a laborious process, forming a large heap of tangled old fishing line 3. Some unscrupulous fishermen dispose of this heap of line 3 in the outdoors, where it is known to snare and kill wildlife. The end of line 2 is wrapped around spool 1, and attached by means of a hand-tied knot 4 that is exposed, being on the outer surface 18 of spool 1. As is evident, this connection, while it may prevent the accidental separation of the line 2 end from the spool 1, is not suited to guard against rotational movements of the line coil in reference to the spool. The less loops of line 2 on spool surface 18, the less friction will hold the coil of line in place.

Figure 2A:
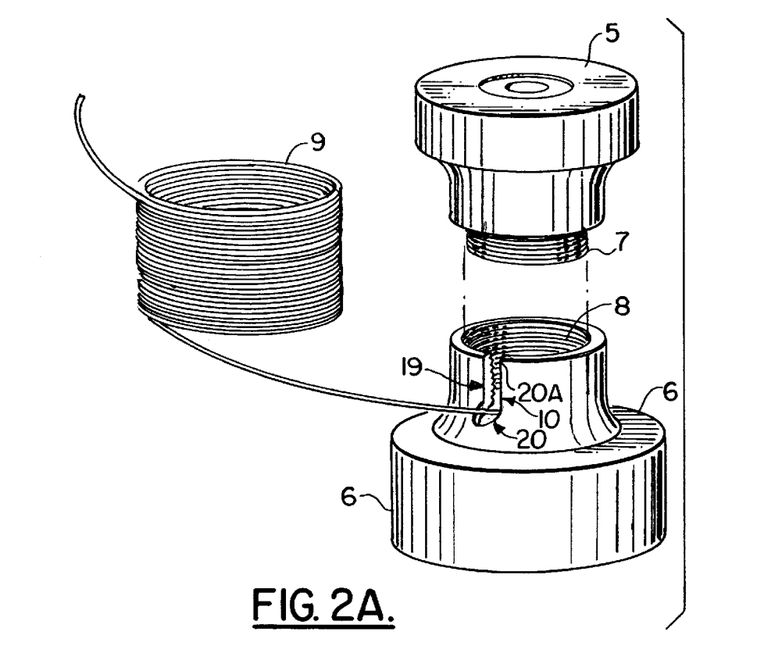
FIG. 2A is an exploded perspective view of a preferred embodiment of the apparatus of the present invention showing the separated parts of the spool, as well as a coil of line in the process of being removed from the spool.
Figure 2B:
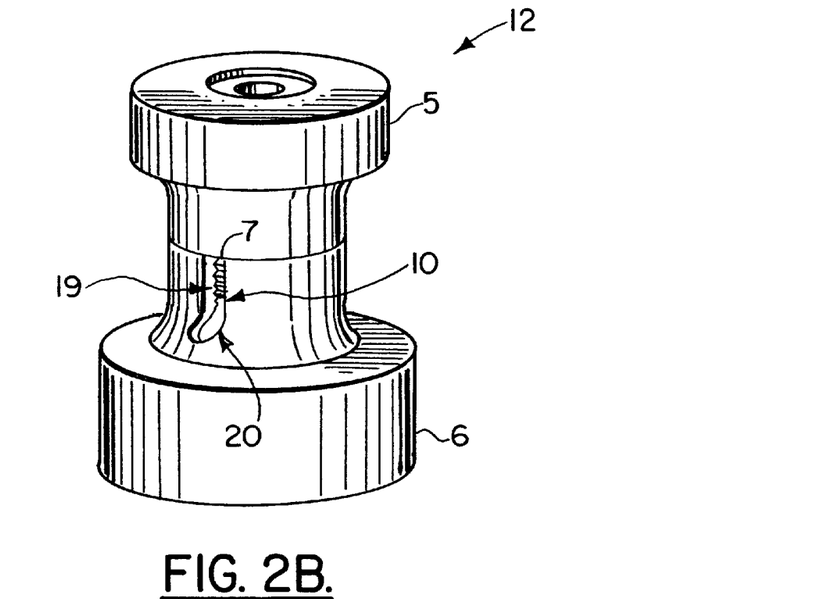
FIG. 2B is a perspective view of the preferred embodiment of the apparatus of the present invention showing the assembled parts of the spool.
Figure 3:
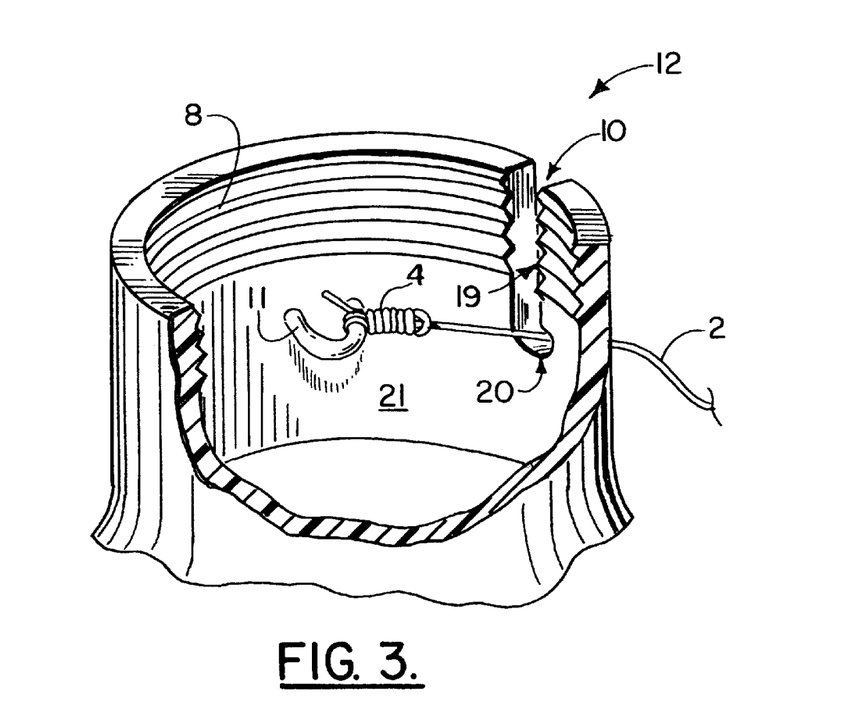
FIG. 3 is a magnified partially cut away perspective view of a portion of the lower part of one embodiment of the new spool.

FIGS. 2A–2B, 3 illustrate a preferred embodiment of this invention designated generally by the numeral 12. In FIG. 2, the improved spool 12 has been separated into two parts, an upper part 5, and a lower part 6, which can be joined together or separated by means of corresponding external and internal threads 7, 8. The removal of old and unreliable fishing line now becomes simple and hassle free. Spool 12, filled with line 2, is taken apart, leaving within seconds a neat coil of old and unreliable fishing line 9, which can be discarded easily without taking up excessive space. FIG. 2B shows upper part 5 and lower part 6 of the new spool 12 joined together.

While the connection of the two parts of the new spool is illustrated as a connection formed by corresponding internal and external threads, it is to be understood that a variety of other mechanisms could be employed to reversibly join the spool parts together without departing from the scope of this invention, including but not confined to tongue and groove connections, locking bolt connections, interference fit connections, and other conventional mechanisms. Moreover, while in the attached illustrations the parts of the spool are joined at a section that is equidistant from the two flanges of the spool, one or more joining mechanism could also be placed underneath or adjacent to or close to one or both of the spool flanges without departing from the concept of this invention.

FIGS. 2A and 2B also illustrate a small slotted opening 10 at the site of attachment of parts 5 and 6. In this illustration, opening 10 has been placed in lower part 6, but placement in upper part 5 is also possible. The opening, in this illustration, is in the form of a transverse slot, preferably shaped like the letter J, with the vertical part 19 of the letter directed generally parallel to the axis of the spool, and the horizontal part 20 extended circumferentially and orthogonally in a clockwise direction. As is apparent from the drawings, the end of line 2 enters the spool 12 through opening 10 for secure attachment at the inside of the spool. While the line can be introduced through opening 10 when parts 5 and 6 are separated, opening 10 is closed when parts 5 and 6 are linked, since end 20A of the lowermost rim of part 5 forms the upper, horizontal border of J shaped opening 10.

Metal loop 11 is preferably located in spatial proximity to opening 10, so that line 2 or knot 4 cannot interfere with the spool shaft in the hoped for event that a big fish sets the drag mechanism in motion.

FIG. 3 illustrates a possible attachment of line 2 to spool 12 in one embodiment of the present invention. A small metal loop 11 is attached to the inside surface 21 of the spool segment 5 or 6 containing opening 10 (in this illustration, lower part 6). Line 2 is connected to part 6 via attachment by knot 4 to metal loop 11.

Figure 4A:
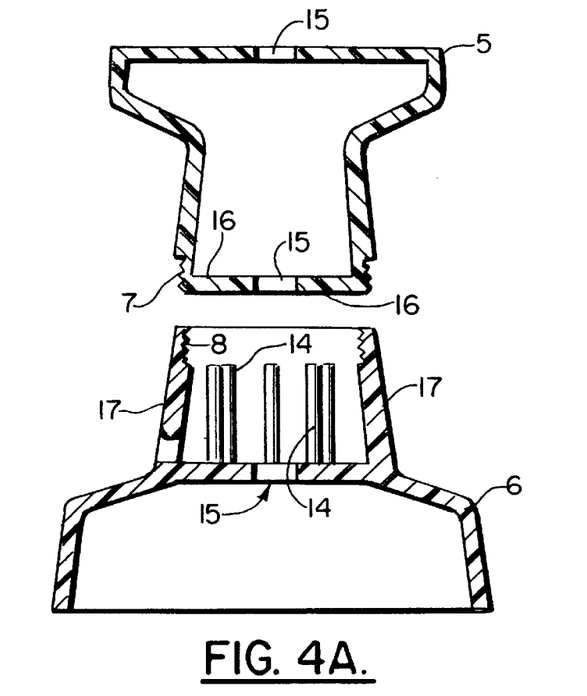
FIGS. 4A–4B are top and end views of a second embodiment of the apparatus of the present invention showing the lower part of the new spool.
Figure 4B:
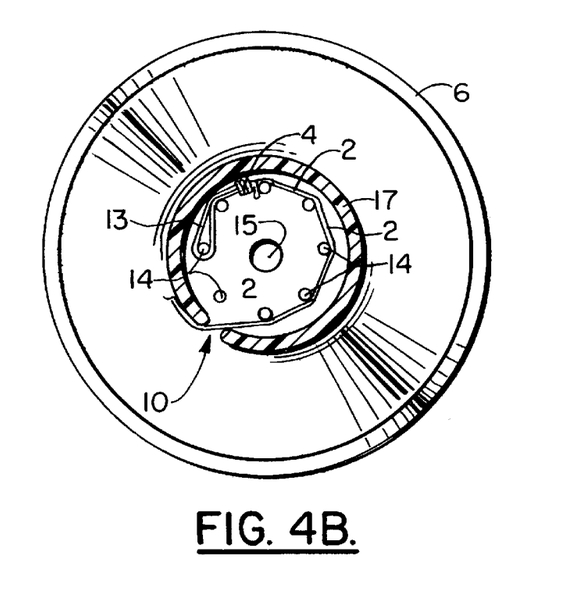

FIGS. 4A and 4B illustrate another embodiment designated as 12A, showing a second possible attachment of line 2 to spool part 6. Line 2 enters lower part 6 at opening 10. Knot 4 at the end of line 2 is not directly wrapped around any part of spool 12A, but forms loop 13, which is slipped over one of a plurality of attachment spikes 14, which protrude from lower part 6 into the interior of spool 12A in a direction parallel to the axis of the spool.

FIG. 4A illustrates in a schematic top view the entering of line 2 through opening 10 into the spool 12A. The interior features attachment spikes 14 (a total of 8 spikes in the FIG. 4A illustration). As can be seen, loop 13 is secured to one of the spikes 14, line 2 is then led preferably in the space between spikes 14 and the interior surface of upper rim 17 of part 6 to the point of exit, opening 10. Numerical 15 depicts the axial openings of the spool for enabling attachment to the reel.

In order to prevent the inadvertent slipping of loop 13 off attachment spike 14, upper part 5 features an annular flange or rim 16 in this particular embodiment. When parts 5 and 6 are joined together, the lower surface of annular flange 16 is situated directly superior to and flush with the tips of spikes 14, allowing no space for loop 13 to slip over spike 14 with resultant disconnecting of line 2 from spool 12.

Figure 5A:
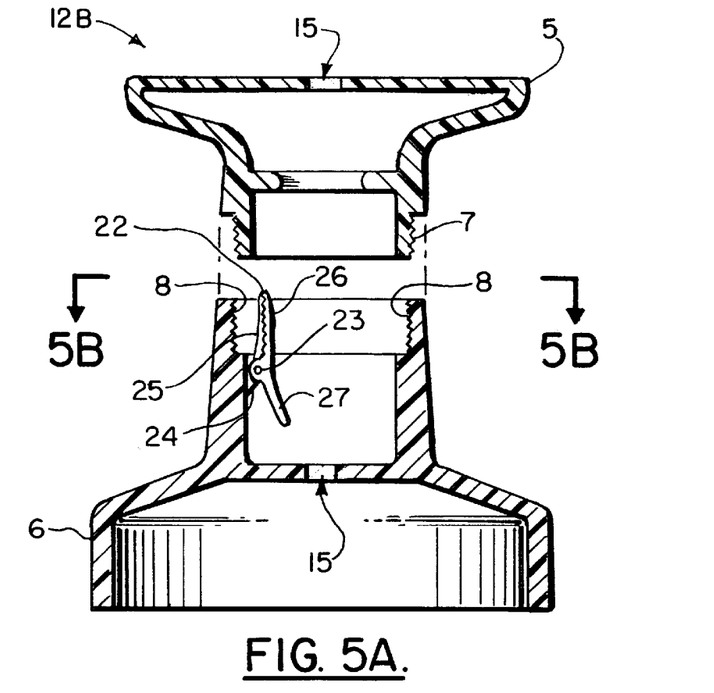
Figure 5B:
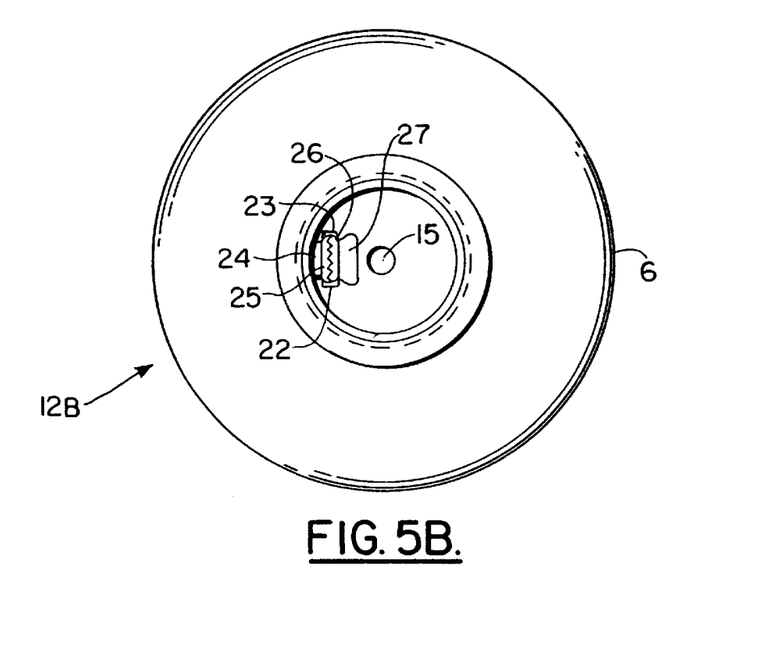

FIGS. 5A and 5B show a third embodiment of the apparatus of the present invention. 5A shows a sectional elevation view. FIG. 5B shows an end view. In the embodiment of FIGS. 5A and 5B, spool 12B provides an additional construction for holding a free end portion of line 2. The spool 12B provides alligator clip 22 having opposed jaws 25, 26. The jaw 25 is affixed rigidly to gusset 24 that is a part of spool part 6, being welded or integrally formed thereto. Jaw 26 and its lever 27 are pivotally connected to the combination of gusset 24 and jaw 25. A spring loading arrangement causes the jaws 25 and 26 to bite together with sufficient force to hold the free end of line 2. In the embodiment of FIGS. 5A and 5B, a slot 10 is provided in the spool part 6 through which line passes after it has been secured first to alligator clip 22. After the line 2 passes externally of slot 10 in the same fashion as shown in FIGS. 2A, 3 and 4A, it is wound around the outer surface of the spool 12 B after the spool parts 5 and 6 have been connected together.

While the advantages of the above described spool were shown for a spinning reel, minor modifications of this new spool design could also be used to improve bait-casting reels, fly reels, and other types of fishing reels.

PARTS LIST

| | |
|---|---|
| 1 | conventional fishing reel spool |
| 2 | fishing line |
| 3 | old, damaged fishing line |
| 4 | knot |
| 5 | upper part of the improved spool |
| 6 | lower part of the improved spool |
| 7 | external threaded portion |
| 8 | internal threaded portion |
| 9 | coil of old fishing line |
| 10 | aperture |
| 11 | attachment hook |
| 12 | new fishing reel spool |
| 12A | new fishing reel spool |
| 12B | new fishing reel spool |
| 13 | fishing line loop |
| 14 | attachment spike |
| 15 | central spool opening |
| 16 | horizontal rim or part 5 |
| 17 | upper rim of part 6 |
| 18 | outer surface |
| 19 | vertical part |
| 20 | horizontal part |
| 20A | top of aperture |
| 21 | inside surface |
| 22 | alligator clip |
| 23 | pivot |
| 24 | gusset |

-continued

PARTS LIST

| | |
|---|---|
| 25 | jaw |
| 26 | jaw |
| 27 | lever |
| SR | spinning reel |
| R | fishing rod |

The foregoing embodiments are presented by way of example only; the scope of the present invention is to be limited only by the following claims.

What is claimed is:

1. A spool for a fixed-spool type fishing reel or spinning reel, comprising:
   a) a generally annular or slightly cone shaped spool body section having attached thereto a first and a second spool end, the first spool end forming a first flange, and the second spool end forming a second flange;
   b) said spool body section being able to be separated into at least two parts;
   c) said separation into said at least two parts allowing for the separation of said first flange from said second flange;
   d) said first end being configured to be mounted on a spinning reel, said second end being configured for the payout of line in a direction roughly parallel to the central axis of the spool,
   e) said spool further featuring a cavity inside having a line attachment for attaching thereto a length of line to be wound of the spool body;
   f) an opening in at least one of the body parts that communicates with said cavity; and
   g) said opening enabling fishing line to pass into the interior of said spool.

2. The spool of claim 1 wherein the opening extends into the cavity next to the connection position.

3. The spool of claim 1 or 2 whereby said two interlocking parts of said spool are joined together with interlocking external and internal threads.

4. The spool of claim 1 or 2, whereby said two parts of said spool are joined together with a tongue and groove connection.

5. The spool of claims 1 whereby said two parts of said spool are joined at a section that is equidistant from its flanges.

6. The spool of claims 1 whereby said two parts of said spool are joined at a section adjacent to or close to one of the spool flanges.

7. The spool of claim 1 whereby said spool has at least one appendage on the interior of said spool for line attachment thereto.

8. The spool of claim 7, whereby said at least one appendage comprises at least one spring loaded clip attached to the interior surface of said spool.

9. The spool of claim 1, wherein the opening extending into the cavity is spatially separated from the connection position.

10. The spool of claim 1 or 2, whereby said spool can be manually separated by a user that grips and rotates the flanges.

11. A spool for a fishing reel, comprising:
   a) an annular spool body section having attached thereto a first and a second spool end, the first spool end forming a first flange, and the second spool end forming a second flange;

b) the flanges enabling said spool body section being able to be manually separated into two parts by a user that grips the flanges at a connection position generally in between the flanges;
c) each of said parts having a first and a second end;
d) each of said parts having one of said flanges attached thereto when separated from each other;
e) a cavity inside the body having a line attachment for attaching thereto a length of line to be wound on the spool body;
f) an opening in at least one of the body parts that communicates with said cavity; and
g) wherein one or both flanges are removable from the spool.

12. A spool for a fishing reel, comprising:
a) an annular spool body section having attached thereto a first and a second spool end, the first spool end forming a first flange, and the second spool end forming a second flange;
b) the flanges enabling said spool body section being able to be manually separated into two parts by a user that grips the flanges at a connection position generally in between the flanges;
c) each of said parts having a first and a second end;
d) each of said parts having one of said flanges attached thereto when separated from each other;
e) a cavity inside the body having a line attachment for attaching thereto a length of line to be wound on the spool body;
f) an opening in at least one of the body parts that communicates with said cavity; and
g) at least one of said parts of said spool has at least one small aperture at the site of attachment to said corresponding part of said spool, said aperture enabling fishing line to pass into the interior of said spool.

13. The spool of claim 12, wherein at least one of said small apertures on at least one of said parts of said spool, is located at a site not adjacent to said site of attachment of said spool parts.

14. A spool for a fishing reel, comprising:
a) an annular spool body section having attached thereto a first and a second spool end, the first spool end forming a first flange, and the second spool end forming a second flange;
b) the flanges enabling said spool body section being able to be manually separated into two parts by a user that grips the flanges at a connection position generally in between the flanges;
c) each of said parts having a first and a second end;
d) each of said parts having one of said flanges attached thereto when separated from each other;
e) a cavity inside the body having a line attachment for attaching thereto a length of line to be wound on the spool body;
f) an opening in at least one of the body parts that communicates with said cavity; and
g) said spool has at least one appendage on the interior of said spool for line attachment thereto, said appendage comprises at least one loop attached to the interior surface of said spool.

15. The spool of claim 14, whereby said at least one appendage comprises one or more attachment darts, said attachment darts being connected firmly with one end to one of said spool parts, said attachment darts pointing with their open ends toward the opposing one of said spool parts.

16. The spool of claims 15 whereby the spool part opposed to carrying said attachment darts has a rim near its site of connection with the opposing spool part,
said rim being located in a transverse plane, orthogonal to the axis of the spool,
said rim being located in proximity to said unconnected ends of said attachment darts when said parts of said spool are joined together,
the distance between said unconnected ends of said attachment darts and said rim in the joined position of said spool parts being too small to permit the passage of fishing line.

17. A spinning reel and spool apparatus comprising:
a) a spool body having a smaller diameter section and spaced apart larger diameter sections;
b) a spinning reel body having a mechanism for winding fishing line on the spool and wherein the spool has a central longitudinal axis;
c) one of said larger diameter sections being a rear portion configured to attach to the spinning reel body, the other larger diameter section being a frontal portion configured to payout line;
d) said spool having front and rear connectable spool halves, each spool half including one of said larger diameter sections, at least one of the circumferential surfaces defining a plane that is transverse to said spool central longitudinal axis;
d) connection for connecting the front and rear spool halves together along corresponding circumferential surfaces;
e) at least one of the spool sections having a opening that communicates with one of the circumferential surfaces; and
f) at least one of said spool halves having an interior with an appendage for enabling fishing line to be tied thereto.

18. The apparatus of claim 17 wherein there are multiple appendages.

19. The spinning reel and spool apparatus of claim 18, whereby
said connection for connecting said front and rear spool parts together is a threaded connection,
each spool part having a threaded portion,
said threaded portions allowing for the connection of said spool parts along corresponding circumferential surfaces,
said opening on said at least one of said spool parts communicating with said circumferential surface,
said opening extending beyond said threaded connection when said spool parts are fully joined together.

20. A spinning reel and spool apparatus comprising:
a) a spool body having a smaller diameter section and spaced apart larger diameter sections;
b) a length of fishing line to be wound upon the spool body;
c) a spinning reel body having a mechanism for winding the fishing line on the spool;
d) one of said larger diameter sections being a rear portion configured to attach to the spinning reel body, the other larger diameter section being a frontal portion configured to payout line;
e) a connection for connecting the front and rear spool halves together along corresponding circumferential surfaces that are spaced in between each of the spaced apart larger diameter sections and wherein the fishing line wound upon the spool body covers said connection and extends generally in between the larger diameter sections during use.

21. A spool for a fixed-spool type fishing reel (spinning reel), comprising:
   a) a generally annular or slightly cone-shaped body section having attached thereto a first and a second spool end, the first spool end forming a first flange, and the second spool end forming a second flange;
   b) said first spool end being able to be mounted on the body of a spinning reel, and said second end allowing for the payout of line in a direction roughly parallel to the central axis of the spool;
   c) said spool being able to be separated into at least two parts;
   d) two of said at least two parts having each one of said flanges attached thereto when separated from each other;
   e) a cavity inside the body of said spool having a line attachment for attaching thereto a length of line to be wound on the spool body; and
   f) at least one of said parts of said spool has at least one small aperture, said aperture enabling fishing line to pass into said cavity of sail spool.

22. A spinning reel and spool apparatus comprising:
   a) a spinning reel body having a mechanism for winding fishing line on a spool;
   b) said spool having a generally annular or slightly cone shaped spool body section having attached thereto a first and a second spool end, the first spool end forming a first flange, and the second spool end forming a second flange;
   c) said spool being able to be separated into at least two parts;
   d) said separation into said at least two parts allowing for the separation of said first flange from said second flange; and
   e) said first end being able to be mounted on said spinning reel, said second end allowing for the payout of line in a direction roughly parallel to the central axis of the spool;
   f) said spool featuring a cavity inside having at least one attachment for attaching thereto a length of line to be wound on the spool body;
   g) an opening in at least one of the body parts that communicates with said cavity;
   h) said opening enabling fishing line to pass into the interior of said spool.

23. The spinning reel and spool apparatus of claim 22, whereby said at least one attachment comprises at least one loop attached to the interior surface of said spool.

24. The spinning reel and spool apparatus of claim 22, whereby said at least one attachment comprises at least one spring-loaded clip attached to the interior surface of said spool.

25. The spinning reel and spool apparatus of claim 22, whereby said at least one attachment comprises one or more attachment darts,
   said attachment darts being connected firmly with one end to one of said spool parts,
   said attachment darts pointing with their unconnected ends toward the opposing one of said spool parts,
   said spool part opposed to said spool part carrying said attachment darts having a rim near its site of connection with the opposing spool part,
   said rim being located in a transverse plane, orthogonal to the axis of the spool,
   said rim being located in proximity to said unconnected ends of said attachment darts when said parts of said spool are joined together,
   the distance between said open ends of said attachment darts and said rim in the joined position of said spool parts being too small to permit the passage of fishing line.

26. A spinning reel and spool apparatus comprising:
   a) a spinning reel body having a mechanism for winding fishing line on a fixed spool wherein the spool has a central longitudinal axis;
   b) a spool body having a smaller diameter section and spaced apart larger diameter sections;
   c) one of said larger diameter sections being a rear portion configured to attach to the spinning reel body, the other larger diameter section being a frontal portion configured to payout line;
   d) said spool having front and rear connectable spool parts, each spool part including one of said larger diameter sections;
   e) a connection for connecting the front and rear spool parts together;
   f) at least one of said spool parts having an opening allowing for the passage of fishing line from the inside to the outside of said spool when said spool parts are joined together; and
   g) at least one of said spool parts having an interior with at least one appendage for enabling fishing line to be tied thereto.

* * * * *